(12) United States Patent
Nagamine et al.

(10) Patent No.: US 10,248,131 B2
(45) Date of Patent: Apr. 2, 2019

(54) MOVING OBJECT CONTROLLER, LANDMARK, AND MOVING OBJECT CONTROL METHOD

(71) Applicants: MegaChips Corporation, Osaka-shi (JP); Kyushu Institute of Technology, Kitakyushu-shi (JP)

(72) Inventors: Kenta Nagamine, Osaka (JP); Norikazu Ikoma, Fukuoka (JP); Fumiya Shingu, Osaka (JP); Hiromu Hasegawa, Osaka (JP)

(73) Assignees: MEGACHIPS CORPORATION, Osaka-shi (JP); KYUSHU INSTITUTE OF TECHNOLOGY, Kitakyushu-shi (JP)

( * ) Notice: Subject to any disclaimer, the term of this patent is extended or adjusted under 35 U.S.C. 154(b) by 0 days.

(21) Appl. No.: 15/076,778

(22) Filed: Mar. 22, 2016

(65) Prior Publication Data

US 2016/0282875 A1    Sep. 29, 2016

(30) Foreign Application Priority Data

Mar. 23, 2015    (JP) .................................. 2015-059275

(51) Int. Cl.
*G05D 1/00*    (2006.01)
*G05D 1/02*    (2006.01)
(Continued)

(52) U.S. Cl.
CPC ......... *G05D 1/0251* (2013.01); *G05D 1/0088* (2013.01); *G05D 1/0236* (2013.01);
(Continued)

(58) Field of Classification Search
CPC ............ G05D 1/0251; G06T 7/50; G06T 7/73
See application file for complete search history.

(56) References Cited

U.S. PATENT DOCUMENTS 9,031,782 B1 *    5/2015    Lemay ................... G01C 21/00
                                                            701/445
2004/0239756 A1    12/2004    Aliaga et al.
(Continued)

FOREIGN PATENT DOCUMENTS

JP    H10-109290 A    4/1998
JP    2008-126401    6/2008
(Continued)

OTHER PUBLICATIONS

Extended European Search Report dated Oct. 5, 2016 in Patent Application No. 16156694.8.
(Continued)

*Primary Examiner* — Jess Whittington
(74) *Attorney, Agent, or Firm* — Xsensus LLP

(57) ABSTRACT

The position of a moving object is estimated with high accuracy based on landmark information, and highly accurate state estimation is performed appropriately at high speed. A landmark detection unit obtains a distance between the moving object and each of two or more landmarks as landmark distance information based on observation data obtained by an observation obtaining unit. A candidate area obtaining unit determines a candidate area for a position of the moving object based on the landmark distance information obtained by the landmark detection unit, and obtains candidate area information indicating the determined candidate area. A state estimation unit estimates an internal state of the moving object based on the observation data, the landmark distance information, and the candidate area information to obtain moving object internal state estimation data, and estimates the environmental map based on the candidate area information and the landmark distance information to obtain environmental map data.

2 Claims, 10 Drawing Sheets

(51) Int. Cl.
  *G06K 9/00* (2006.01)
  *G06K 9/62* (2006.01)
  *G06T 7/60* (2017.01)
  *G06T 7/20* (2017.01)
  *G06T 7/73* (2017.01)
  *G06T 7/50* (2017.01)

(52) U.S. Cl.
  CPC ......... *G05D 1/0248* (2013.01); *G05D 1/0274* (2013.01); *G06K 9/00664* (2013.01); *G06K 9/6201* (2013.01); *G06T 7/20* (2013.01); *G06T 7/50* (2017.01); *G06T 7/60* (2013.01); *G06T 7/73* (2017.01); *Y10S 901/01* (2013.01); *Y10S 901/47* (2013.01)

(56) References Cited

U.S. PATENT DOCUMENTS

| | | | |
|---|---|---|---|
| 2005/0182518 A1* | 8/2005 | Karlsson | G05D 1/0246 700/253 |
| 2008/0027591 A1* | 1/2008 | Lenser | G05D 1/0251 701/2 |
| 2008/0119961 A1 | 5/2008 | Myeong et al. | |
| 2010/0148977 A1* | 6/2010 | Tseng | G01S 5/14 340/686.1 |
| 2010/0215216 A1 | 8/2010 | Hong et al. | |
| 2011/0010033 A1* | 1/2011 | Asahara | G05D 1/024 701/26 |
| 2011/0206236 A1* | 8/2011 | Center, Jr. | G06T 7/579 382/103 |
| 2011/0298923 A1* | 12/2011 | Mukae | G08G 1/205 348/144 |
| 2012/0029698 A1 | 2/2012 | Myeong et al. | |
| 2013/0166134 A1* | 6/2013 | Shitamoto | G05D 1/024 701/26 |
| 2014/0350839 A1* | 11/2014 | Pack | G01C 21/30 701/409 |

FOREIGN PATENT DOCUMENTS

| | | |
|---|---|---|
| JP | 2009-217456 A | 9/2009 |
| JP | 2011-48706 | 3/2011 |

OTHER PUBLICATIONS

Zafer Arican, "Vision-Based Robot Localization Using Artificial and Natural Landmarks" A thesis submitted to the graduate school of natural and applied sciences of middle east technical university, XP055305512, 2014, 93 Pages.
Office Action dated Feb. 19, 2018 in European Patent Application No. 16 156 694.8.
Extended European Search Report dated Nov. 29, 2018 in European Application No. 18189952.7.
European Office Action dated Nov. 28, 2018 in European Application No. 16156694.8.
Japanese Office Action dated Feb. 5, 2019 in Japanese Application No. 2015-059275.

* cited by examiner

US 10,248,131 B2

MOVING OBJECT CONTROLLER, LANDMARK, AND MOVING OBJECT CONTROL METHOD

This application claims priority to Japanese Patent Application No. 2015-059275 filed on Mar. 23, 2015, the entire disclosure of which is hereby incorporated herein by reference (IBR).

BACKGROUND OF THE INVENTION

Field of the Invention

The present invention relates to a technique for controlling a moving object using simultaneous localization and mapping (SLAM).

Description of the Background Art

Using simultaneous localization and mapping (SLAM), a moving object, such as an autonomous robot, estimates its position and simultaneously generates an environmental map while moving autonomously.

A robot (moving object) that moves autonomously with SLAM generates an environmental map around the robot using observation data obtained with a sensor mounted on the robot and using inputs for controlling the robot, while estimating the position and the posture of the robot in the generated environmental map. More specifically, the robot estimates its position and posture $X_t$ (or $X_{1:t}=\{X_1, X_2, \ldots, X_t\}$) and obtains an environmental map m using a control input sequence $U_{1:t}=\{U_1, U_2, \ldots, U_t\}$ and an observation sequence $Z_{1:t}=\{Z_1, Z_2, \ldots, Z_t\}$ in the state space model where the robot follows the system model $x_t \sim g(x_t|x_{t-1}, U_t)$ ($U_t$ is a control input) and the observation follows the observation model $Z_t \sim h(Z_t|x_t, m)$ (m is an environmental map).

Techniques have been developed to estimate the posture of a robot with high accuracy using particle filters (e.g., Japanese Unexamined Patent Application Publication No. 2008-126401, or Patent Literature 1).

A sensor used to obtain observation data may typically be an RGB camera incorporating a visible light image sensor, or a range finder that obtains distance information using infrared light or laser light. Two or more different sensors may be used in combination to obtain observation data.

A robot (moving object) that moves autonomously with SLAM typically generates a topological environmental map, instead of generating a geometric environmental map. The environmental map is obtained using, for example, information about landmarks. In this case, the environmental map contains a plurality of sets of landmark information. Each landmark has parameters including variance-covariance matrices expressing (1) information about the position of the landmark and (2) the uncertainty of positional information for the landmark.

When the robot that moves autonomously with SLAM incorporates an RGB camera as its sensor, the robot uses, as landmarks, points or lines with features or objects with distinguishable markers. The robot detects (identifies) an image region corresponding to a landmark in an image captured by the RGB camera to obtain information about the landmark. In this case, the actual position of the robot relative to the actual position of the landmark is determined using the image obtained by the RGB camera, and observation data at the current time is obtained based on the identification result.

When the position of a landmark is obtained from an image captured by the RGB camera as described above, the actual position of the robot and the actual position of the landmark may not be easily estimated with high accuracy. The RGB camera or the range finder has high directivity and thus has a limited observable range. Of many landmarks arranged around the robot, a small number of landmarks can be detected at a time based on data obtained by the RGB camera or the range finder. For example, (1) the distance from the robot to a detected landmark and (2) the angle formed by a predetermined reference axis and a straight line connecting the robot and the detected landmark as viewed from above an environment in which the robot moves are obtained as information about a landmark. In this case, the position of the robot may not be estimated with high accuracy based on the obtained landmark information. This is because all points on the circumference of a circle centered on the position of the detected landmark and having its radius being a distance from the robot to the detected landmark can be candidates for the position of the robot. More specifically, such many candidates for the position of the robot increase the amount of processing to estimate the position of the robot at the current time. In this case, the position of the robot cannot be easily estimated with high accuracy. When the position of the robot cannot be estimated with high accuracy, the error between the actual internal state of the robot and the estimated internal state of the robot increases, and may disable the robot (moving object) from moving autonomously in a stable manner.

In response to the above problems, it is an object of the present invention to provide a moving object controller and a program for controlling a moving object in an appropriate manner by estimating the position of the moving object (robot) accurately based on landmark information and performing a highly accurate state estimation process at high speed in an appropriate manner, and also to provide a landmark used with the controller and the program.

SUMMARY

A first aspect of the invention provides a moving object controller for controlling a moving object that moves in an environment in which at least one landmark set including two or more landmarks is arranged. The moving object controller performs processing for generating an environmental map expressed using information about the landmarks and performs processing for estimating an internal state of the moving object. The controller includes an observation obtaining unit, a landmark detection unit, a candidate area detection unit, and a state estimation unit.

The observation obtaining unit obtains observation data from an observable event.

The landmark detection unit obtains, based on the observation data obtained by the observation obtaining unit, (1) a distance between the moving object and each of the two or more landmarks included in the landmark set as landmark distance information, and (2) an angle formed by a predetermined axis and a line connecting the moving object and each of the two or more landmarks included in the landmark set as landmark angle information.

The candidate area obtaining unit determines a candidate area for a position of the moving object based on the landmark distance information obtained by the landmark detection unit, and obtains information indicating the determined candidate area as candidate area information.

The state estimation unit estimates the internal state of the moving object based on the observation data obtained by the observation obtaining unit, the landmark distance information and the landmark angle information generated by the landmark detection unit, and the candidate area information obtained by the candidate area obtaining unit to obtain moving object internal state estimation data, and estimates the environmental map based on the candidate area information, the landmark distance information, and the landmark angle information to obtain environmental map data.

DESCRIPTION OF THE PREFERRED EMBODIMENTS

First Embodiment

A first embodiment will now be described with reference to the drawings.

1.1 Structure of Moving Object Controller

Figure 1:
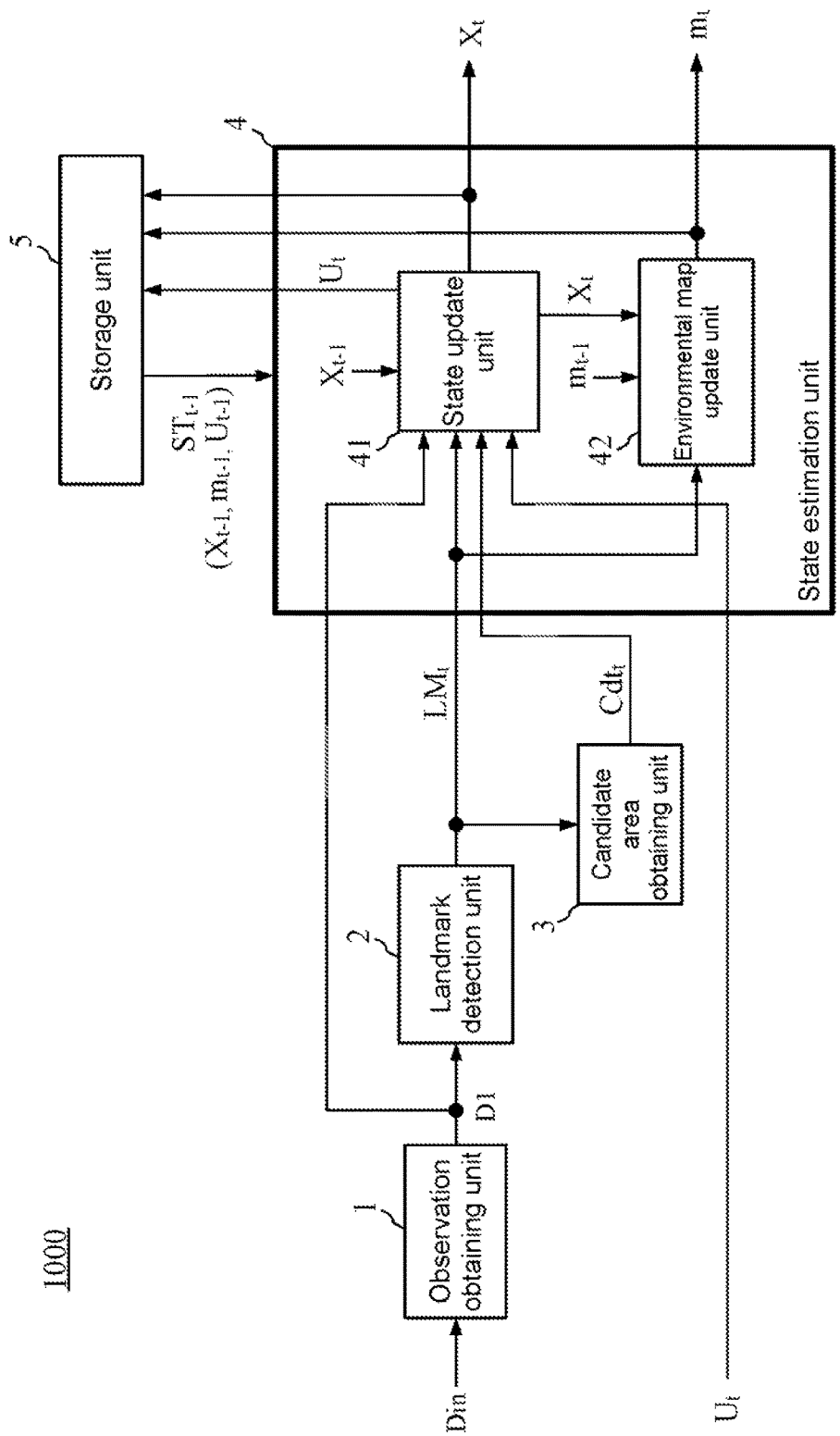
FIG. 1 is a schematic block diagram of a moving object controller 1000 according to a first embodiment.

FIG. 1 is a schematic block diagram of a moving object controller 1000 according to a first embodiment.

The moving object controller 1000 is mounted on a moving object, such as an autonomous robot Rbt1 (not shown).

As shown in FIG. 1, the moving object controller 1000 includes an observation obtaining unit 1, a landmark detection unit 2, a candidate area obtaining unit 3, a state estimation unit 4, and a storage unit 5.

For ease of explanation, observation data D1 obtained by the observation obtaining unit 1 includes an image (image data) captured by an imaging device incorporating a distance sensor (not shown), which is mounted on the moving object (robot Rbt1), and a distance image (distance data) obtained by the imaging device incorporating the distance sensor.

The observation obtaining unit 1 receives data obtained by the imaging device incorporating the distance sensor (not shown), which is mounted on the moving object (robot Rbt1), as input data Din. The observation obtaining unit 1 obtains the observation data D1, which includes an image (image data) D1_img and a distance image (distance data) D1_d, based on the input data Din. The observation obtaining unit 1 outputs the obtained observation data D1 to the landmark detection unit 2 and a state update unit 41 included in the state estimation unit 4.

The landmark detection unit 2 receives the observation data D1, which is output from the observation obtaining unit 1. The landmark detection unit 2 obtains information about the distance and the direction (angle) from the robot Rbt1 to a landmark based on the observation data D1 (the image data D1_img and the distance image D1_d) The landmark detection unit 2 outputs a signal including the obtained information to the candidate area obtaining unit 3, and the state update unit 41 and an environmental map update unit 42 included in the state estimation unit 4 as a landmark detection signal $LM_t$.

The candidate area obtaining unit 3 receives the landmark detection signal $LM_t$ output from the landmark detection unit 2. Based on the landmark detection signal $LM_t$, the candidate area obtaining unit 3 obtains robot position candidate information $Cdt_t$, which is used to estimate the candidate position for the position of the robot Rbt1 at the current time. The candidate area obtaining unit 3 outputs the obtained robot position candidate information $Cdt_t$ to the state update unit 41 included in the state estimation unit 4.

As shown in FIG. 1, the state estimation unit 4 includes the state update unit 41 and the environmental map update unit 42.

The state update unit 41 receives observation data D1, which is output from the observation obtaining unit 1, a landmark detection signal $LM_t$, which is output from the landmark detection unit 2, robot position candidate information $Cdt_t$, which is output from the candidate area obtaining unit 3, control input data $U_t$ for the moving object (robot Rbt1), and internal state data $X_{t-1}$ indicating the internal state of the moving object (robot Rbt1) at time t−1, which is read from the storage unit 5. The state update unit 41 estimates the internal state of the robot Rbt1 based on the observation data D1, the landmark detection signal $LM_t$, the robot position candidate information $Cdt_t$, the control input data $U_t$, and the internal state data $X_{t-1}$ of the robot Rbt1 at time t−1 to obtain the estimation result as the internal state data $X_t$ of the moving object at the current time t (update the internal state data). The state update unit 41 then outputs the obtained internal state data $X_t$ of the moving object at the current time t out of the state estimation unit 4, and also to the storage unit 5. The internal state data $X_t$ externally output from the state estimation unit 4 is used by, for example, a function unit (central control unit) that centrally controls the moving object (automatically moving robot Rbt1) (not shown) as data to control the moving object (automatically moving robot Rbt1).

The state update unit 41 also outputs the internal state data $X_t$ corresponding to the position of the robot Rbt1 at the current time t to the environmental map update unit 42.

The state update unit 41 also outputs the control input data $U_t$ for the robot Rbt1 at the current time t to the storage unit 5.

The environmental map update unit 42 receives a landmark detection signal $LM_t$, which is output from the landmark detection unit 2, environmental map data $m_{t-1}$ at time t−1, which is read from the storage unit 5, and internal state data $X_1$ of the robot Rbt1 at the current time t, which is output from the state update unit 41. The environmental map update unit 42 obtains information about a detected landmark based on the landmark detection signal $LM_t$, and updates the environmental map data based on the obtained landmark information, the environmental map data $m_{t-1}$ at time t−1, and the internal state data $X_t$ of the robot Rbt1 at the current time t to obtain environmental map data $m_t$ at the current time t. The environmental map update unit 42 then outputs the updated environmental map data $m_t$ out of the state estimation unit 4, and also to the storage unit 5. The environmental map data $m_t$ externally output from the state estimation unit 4 is used by, for example, a function unit (central control unit) that centrally controls the moving object (automatically moving robot Rbt1) (not shown) as data to control the moving object (automatically moving robot Rbt1).

The storage unit 5 receives and stores internal state data $X_t$ of the moving object at the current time t and control input data $U_t$, which are output from the state update unit 41 included in the state estimation unit 4, and environmental map data $m_t$. The data stored in the storage unit 5 is read by the state estimation unit 4 at predetermined timing. The storage unit 5 can store a plurality of sets of internal state data and environmental map data obtained at a plurality of times.

The data at the current time t refers to data obtained using the target observation data D1 by the moving object controller 1000 (internal state data $X_t$ of the moving object and environmental map data $m_t$). The data at time t−1 preceding the current time t by one time refers to data obtained by the moving object controller 1000 at the time preceding the current time t by one time (internal state data $X_{t-1}$ of the moving object and environmental map data $m_{t-1}$). The data at time t−k preceding the current time t by k times (k is a natural number) refers to data obtained by the moving object controller 1000 at the time preceding the current time t by k times (internal state data $X_{t-k}$ of the moving object and environmental map data $m_{t-k}$).

The above data may be obtained at synchronous timing or at asynchronous timing.

1.2 Operation of Moving Object Controller

The operation of the moving object controller 1000 with the above-described structure will now be described.

In the example described below, the robot Rbt1 is a moving object that moves autonomously. The input data Din is an image (captured image) captured by an imaging device incorporating a visible image sensor and a distance sensor (not shown), which is mounted on the robot Rbt1, and a distance image (distance data). The environmental map is generated based on information about landmarks.

To allow the moving object controller 1000 to generate an environmental map, landmark sets each including two landmarks are arranged in an environment in which the robot Rbt1 moves. Each set of landmarks is provided with information such as a color code or a specific pattern to differentiate from other sets of landmarks. This information is used to identify a set (landmark set) including a detected landmark.

Figure 2:
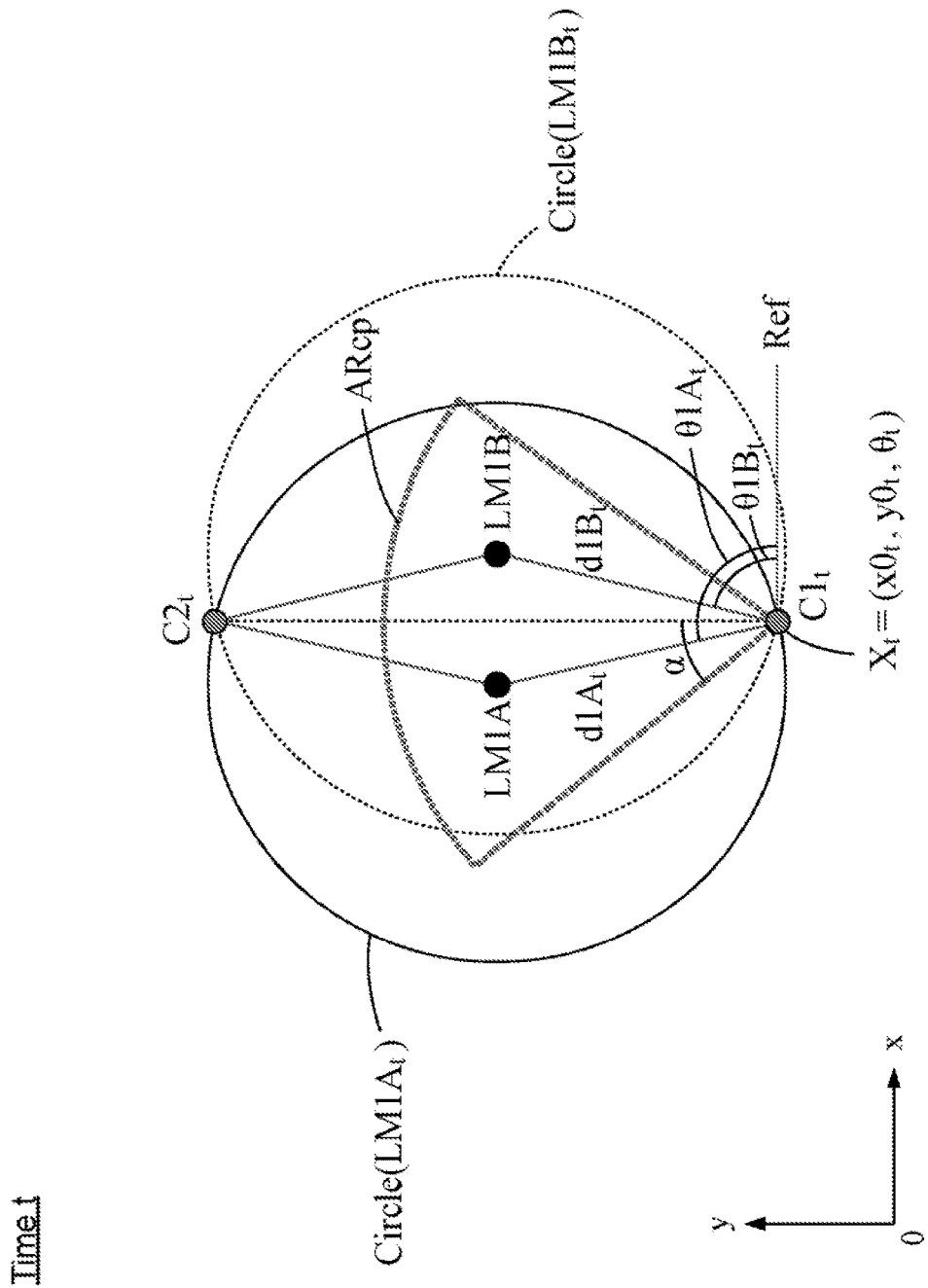
FIG. 2 is a diagram showing the positional relationship between candidate points $C1_t$ and $C2_t$ for the position of a robot Rbt1 at time t, and a set of landmarks LM1A and LM1B (viewed from above).

FIG. 2 is a diagram showing the positional relationship between candidate points $C1_t$ and $C2_t$ for the position of the robot Rbt1 at time t, and a set of landmarks LM1A and LM1B (viewed from above). In FIG. 2, the space is defined by x-axis and y-axis, and the origin indicated by 0. For ease of explanation, the processing performed by the moving object controller will be described based on the positional relationship between the robot Rbt1 and the landmarks LM1A and LM1B on a two-dimensional plane (x-y plane) as shown in FIG. 2. However, the moving object controller may perform the processing based on the positional relationship between the robot Rbt1 and the landmarks LM1A and LM1B in a three-dimensional space.

Figure 3:
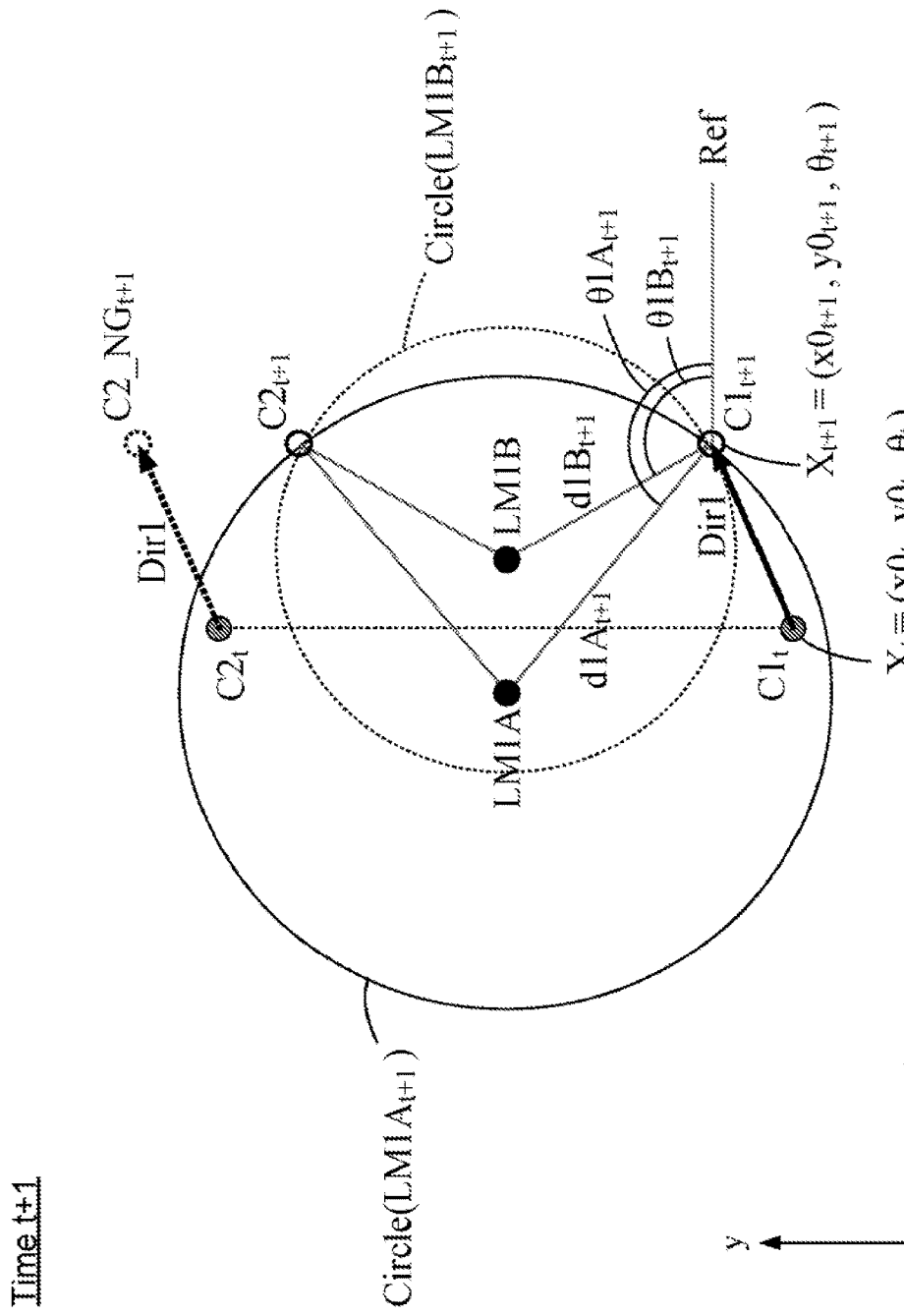
FIG. 3 is a diagram showing the positional relationship between candidate points $C1_{t+1}$ and $C2_{t+1}$ for the position of the robot Rbt1 at time t+1, and the set of landmarks LM1A and LM1B (viewed from above).

FIG. 3 is a diagram showing the positional relationship between candidate points $C1_{t+1}$ and $C2_{t+1}$ for the position of the robot Rbt1 at time t+1, and a set of landmarks LM1A and LM1B (viewed from above). In FIG. 3, the space is also defined by x-axis and y-axis, and the origin indicated by 0 as in FIG. 2.

In the example described below, the robot Rbt1 at time t at the position indicated by the point $C1_t$ in FIG. 2 receives control data for moving the robot in the direction of arrow Dir1 shown in FIG. 3. At time t+1, the robot Rbt1 moves to the position indicated by the point $C1_{t+1}$ in FIG. 3.

The moving object controller 1000 uses (1) data indicating the internal state of the robot Rbt1 and (2) data representing an environmental map described below.

1.2.1 Internal State Data of Robot Rbt1

The moving object controller 1000 sets, as data indicating the internal state of the robot Rbt1, the internal state data $X_t$ indicating the position and the angle of the robot Rbt1 at time t.

The internal state data $X_t$ indicating the position and the angle of the robot Rbt1 at time t is a three-dimensional state vector written as $$X_t = (x0_t, y0_t, \theta_t)$$

where $x0_t$ is an expected value of the x coordinate of the robot Rbt1 at time t, $y0_t$ is an expected value of the y coordinate of the robot Rbt1 at time t, and $\theta_t$ is an expected value of the angle of the robot Rbt1 (the orientation of the robot Rbt1) with respect to the positive direction of x-axis at time t.

The moving object controller 1000 uses particle filtering (Monte Carlo approximation) to estimate the internal state of the robot Rbt1.

In particle filtering, the posterior probability distribution of a state vector $X_{t-1}$ at time t−1 is used as the prior probability distribution of the state vector $X_t$ at the current time t, and the predictive probability distribution of the state vector $X_t$ at the current time t is obtained through prediction using the prior probability distribution of the state vector $X_t$ at the current time t. A likelihood is then calculated based on the obtained predictive probability distribution and actual observation data (observation data at the current time t). At the ratio proportional to the calculated likelihood, particles are sampled without changing the total number of the particles. Through the processing described above, the internal state of the robot Rbt1 is estimated.

In this manner, the moving object controller 1000 sets the data $X_t$ indicating the internal state of the robot Rbt1.

1.2.2 Data Representing Environmental Map

The moving object controller 1000 sets environmental map data $m_t$ at time t as data representing an environmental map.

The environmental map data $m_t$ includes information about landmarks. When the robot Rbt1 detects a landmark, information about the detected landmark is added to the environmental map data $m_t$.

The moving object controller 1000 sets the environmental map data $m_t$ at time t written as $$m_t = [LM1AP_t, LM1BP_t, \ldots LMkAP_t, LMkBP_t]$$

where k is a natural number.

In this formula, $LMkAP_t$ is internal state data corresponding to the position of one landmark included in the k-th landmark set at time t, and $LMkBP_t$ is the internal state data corresponding to the position of the other landmark included in the k-th landmark set at time t. One landmark set includes two landmarks.

More specifically, the moving object controller 1000 determines the set of internal state data for 2×k landmarks included in k landmark sets as the environmental map data $m_t$ at time t.

In the example shown in FIG. 2, the environmental map data $m_t$ includes information about the two landmarks LM1A and LM1B included in one landmark set. In the example shown in FIG. 2, the environmental map data $m_t$ is written as $$m_t = [LM1AP_t, LM1BP_t].$$

Information $LM1AP_t$ about the landmark LM1A and information $LM1BP_t$ about the landmark LM1B (the internal state data corresponding to the landmark positions) are set in the manner described below.

For the landmark LM1A, $$LM1AP_t = (d1A_t, \theta1A_t)$$

where $d1A_t$ is a distance from the robot Rbt1 to the landmark LM1A, and $\theta1A_t$ is an angle formed by x-axis and a straight line connecting the robot Rbt1 and the landmark LM1A as viewed from above.

For the landmark LM1B, $$LM1BP_t = (d1B_t, \theta1B_1)$$

where $d1B_t$ is a distance from the robot Rbt1 to the landmark LM1B, and $\theta1B_t$ is an angle formed by x-axis and a straight line connecting the robot Rbt1 and the landmark LM1B as viewed from above.

For ease of explanation, the robot Rbt1 incorporating the moving object controller 1000 in the example described below obtains the internal state data of the robot Rbt1 and environmental map data based on the two landmarks LMA1 and LMB1 included in one landmark set as shown in FIGS. 2 and 3.

1.2.3 Details of Processing

The processing of the moving object controller 1000 will now be described in detail.

Processing at Time t

At time t, the robot Rbt1 and the landmarks LM1A and LM1B are positioned as shown in FIG. 2. The imaging device incorporating the distance sensor, which is mounted on the moving object controller 1000, captures an captured image (image data) of an area ARcp shown in FIG. 2 and obtains a distance image (distance data).

The observation obtaining unit 1 obtains the observation data D1, which includes the image (image data) D1_img of the area Arcp and the distance image (distance data) D1_d, from the input data Din received from the imaging device incorporating the distance sensor mounted on the moving object controller 1000. The observation obtaining unit 1 outputs the obtained observation data D1 to the landmark detection unit 2 and the state update unit 41 included in the state estimation unit 4.

The landmark detection unit 2 obtains information about the distance and the direction (angle) from the robot Rbt1 to the landmarks LM1A and LM1B from the observation data D1 (the image data D1_img and the distance image D1_d). More specifically, the landmark detection unit 2 obtains the data $LM1AP_t$ and the data $LM1BP_t$ described below.

For the landmark LM1A, $$LM1AP_t = (d1A_t, \theta1A_t)$$

where $d1A_t$ is a distance from the robot Rbt1 to the landmark LM1A, and $\theta1A_t$ is an angle formed by x-axis and a straight line connecting the robot Rbt1 and the landmark LM1A as viewed from above.

For the landmark LM1B, $$LM1BP_t = (d1B_t, \theta1B_1)$$

where $d1B_t$ is a distance from the robot Rbt1 to the landmark LM1B, and $\theta1B_t$ is an angle formed by x-axis and a straight line connecting the robot Rbt1 and the landmark LM1B as viewed from above.

A signal including the data $LM1AP_t$ and the data $LM1BP_t$ obtained for the landmarks LM1A and LM1B are output as the landmark detection signal $LM_t$ from the landmark detection unit 2 to the candidate area obtaining unit 3, and the state update unit 41 and the environmental map update unit 42 included in the state estimation unit 4.

Based on the landmark detection signal $LM_t$, the candidate area obtaining unit 3 obtains information for estimating a candidate position of the robot Rbt1 at the current time t.

More specifically, the candidate area obtaining unit 3 determines two intersection points $C1_t$ and $C2_t$ of (1) a circle centered on the point LM1A with its radius being a distance $d1A_t$ from the robot Rbt1 to the landmark LM1A, and (2) a circle centered on the point LM1B with its radius being a distance $d1B_t$ from the robot Rbt1 to the landmark LM1B as shown in FIG. 2. The candidate area obtaining unit 3 then outputs information about the two intersection points $C1_t$ and $C2_t$ (information for identifying the intersection points $C1_t$ and $C2_1$) to the state update unit 41 included in the state estimation unit 4 as robot position candidate information $Cdt_t$.

In some embodiments, the candidate area obtaining unit 3 may perform processing considering errors and the estimation accuracy of the landmark positions (the accuracy of the internal state data corresponding to the landmarks) and output information about an area with a predetermined size including the two intersection points $C1_t$ and $C2_t$ to the state update unit 41 included in the state estimation unit 4 as the robot position candidate information $Cdt_t$.

The state update unit 41 included in the state estimation unit 4 estimates the internal state of the robot Rbt1 based on the observation data D1, the landmark detection signal $LM_t$, the robot position candidate information $Cdt_t$, the control input data $U_t$, and the internal state data $X_{t-1}$ of the robot Rbt1 at time t−1 to obtain the estimation result as the internal state data $X_t$ of the robot Rbt1 at the current time t (update the internal state data).

More specifically, the state update unit 41 estimates one of the points $C1_t$ and $C2_t$, which are two candidates for the position of the robot Rbt1, as the position of the robot Rbt1 at time t based on the robot position candidate information $Cdt_t$. In the example below, the state update unit 41 estimates the point $C1_t$ as the position of the robot Rbt1 at time t.

The internal state data $X_t$ of the robot Rbt1 at time t obtained by the state update unit 41 is output from the state update unit 41 to the storage unit 5, and is stored into the storage unit 5.

The environmental map update unit 42 obtains information about a detected landmark based on the landmark detection signal $LM_t$, which is output from the landmark detection unit 2. The environmental map update unit 42 updates the environmental map data based on the obtained landmark information, the environmental map data $m_{t-1}$ at time t−1, and the internal state data $X_t$ of the robot Rbt1 at the current time t to obtain the environmental map data $m_t$ at the current time t.

More specifically, when the positional coordinates of the landmark LM1A at time t on the x-y plane are indicated by $(x1A_t, y1A_t)$, and the positional coordinates of the landmark LM1B at time t on the x-y plane are by $(x1B_t, y1B_t)$, the environmental map update unit 42 obtains the positional coordinates (positional information) of the landmarks LM1A and LM1B at time t on the x-y plane using the formulae below:

$$x1A_t = x0_t + d1A_t \times \cos(\theta 1A_t),$$

$$y1A_t = y0_t + d1A_t \times \sin(\theta 1A_t),$$

$$x1B_t = x0_t + d1B_t \times \cos(\theta 1B_t), \text{ and}$$

$$y1B_t = y0_t + d1B_t \times \sin(\theta 1B_t).$$

The environmental map update unit 42 updates the environmental map data $m_t$ using the data obtained as described above.

At time t, the robot Rbt1 also receives a control input $U_t$. In the example below, the control input $U_t$ is control input data for moving the robot Rbt1 in the direction of arrow Dir1 shown in FIG. 3.

Processing at Time t+1

When controlled using the control input data $U_t$ at time t, the robot Rbt1 is predicted to have moved to the position indicated by the point $C1_{t+1}$ in FIG. 3 or to the position indicated by the point $C2\_NG_{t+1}$ in FIG. 3 at time t+1.

The observation obtaining unit 1 obtains the observation data D1, which is the image (image data) D1_img of the area Arcp and the distance image (distance data) D1_d, from the input data Din received from the imaging device incorporating the distance sensor mounted on the moving object controller 1000. The observation obtaining unit 1 then outputs the obtained observation data D1 to the landmark detection unit 2 and the state update unit 41 included in the state estimation unit 4.

The landmark detection unit 2 obtains information about the distance and the direction (angle) from the robot Rbt1 to the landmarks LM1A and LM1B based on the observation data D1 (the image data D1_img and the distance image D1_d). More specifically, the landmark detection unit 2 obtains the data $LM1AP_t$ and the data $LM1BP_t$ described below.

For the landmark LM1A, $$LM1AP_{t+1} = (d1A_{t+1}, \theta 1A_{t+1})$$

where $d1A_{t+1}$ is a distance from the robot Rbt1 to the landmark LM1A, and $\theta 1A_{t+1}$ is an angle formed by x-axis and a straight line connecting the robot Rbt1 and the landmark LM1A as viewed from above.

For the landmark LM1B, $$LM1BP_{t+1} = (d1B_{t+1}, \theta 1B_{t+1})$$

where $d1B_{t+1}$ is a distance from the robot Rbt1 to the landmark LM1B, and $\theta 1B_{t+1}$ is an angle formed by x-axis and a straight line connecting the robot Rbt1 and the landmark LM1B as viewed from above.

A signal including the data $LM1AP_{t+1}$ and the $LM1BP_{t+1}$ obtained for the landmarks LM1A and LM1B is output as the landmark detection signal $LM_{t+1}$ from the landmark detection unit 2 to the candidate area obtaining unit 3, and the state update unit 41 and the environmental map update unit 42 included in the state estimation unit 4.

Based on the landmark detection signal $LM_{t+1}$, the candidate area obtaining unit 3 obtains information for estimating the candidate position for the position of the robot Rbt1 at the current time t+1.

More specifically, as shown in FIG. 3, the candidate area obtaining unit 3 determines the two intersection points $C1_{t+1}$ and $C2_{t+1}$ of (1) a circle centered on the point LM1A with its radius being a distance $d1A_{t+1}$ from the robot Rbt1 to the landmark LM1A and (2) a circle centered on the point LM1B with its radius being a distance $d1B_{t+1}$ from the robot Rbt1 to the landmark LM1B as shown in FIG. 3. The candidate area obtaining unit 3 outputs information about the two intersection points $C1_{t+1}$ and $C2_{t+1}$ (information for identifying the intersection points $C1_{t+1}$ and $C2_{t+1}$) to the state update unit 41 included in the state estimation unit 4 as the robot position candidate information $Cdt_{t+1}$.

In some embodiments, the candidate area obtaining unit 3 may perform processing considering errors and the estimation accuracy of the landmark positions (the accuracy of the internal state data corresponding to the landmarks) and output information about an area with a predetermined sized including the two intersection points $C1_{t+1}$ and $C2_{t+1}$ to the state update unit 41 included in the state estimation unit 4 as the robot position candidate information $Cdt_{t+1}$.

The state update unit 41 included in the state estimation unit 4 estimates the internal state of the robot Rbt1 based on the observation data D1, the landmark detection signal $LM_{t+1}$, the robot position candidate information $Cdt_{t+1}$, the control input data $U_{t+1}$, and the internal state data $X_t$ of the robot Rbt1 at time t to obtain the estimation results as the internal state data $X_{t+1}$ of the robot Rbt1 at the current time t+1 (update the internal state data).

More specifically, the state update unit 41 estimates one of the points $C1_{t+1}$ and $C2_{t+1}$, which are two candidates for the position of the robot Rbt1, as the position of the robot Rbt1 at time t+1 based on the robot position candidate information $Cdt_{t4}$.

The moving object controller 1000 obtains (1) the points $C1_t$ and $C2_t$ as two candidate points for the position of the robot Rbt1 at time t, and (2) the points $C1_{t+1}$ and $C2_{t+1}$ as two candidate points for the position of the robot Rbt1 at time t+1. The control input $U_t$ provided to the robot Rbt1 at time t is data for moving the robot Rbt1 in the direction of arrow Dir1 shown in FIG. 3.

The state update unit 41 predicts that the robot Rbt1 is at the point $C1_{t+1}$ or the point $C2\_NG_{t+1}$ in FIG. 3 at time t based on the control input $U_t$ provided to the robot Rbt1 at time t and the two candidate points $C1_t$ and $C2_t$ for the position of the robot Rbt1 at time t estimated by the moving object controller 1000 (prediction 1).

Based on actual observation performed at time t+1, the distance between the robot Rbt1 and the landmark LM1A at time t+1 is the distance $d1A_{t+1}$, and the distance between the robot Rbt1 and the landmark LM2A is the distance $d2A_{t+1}$. Using this actual observation at time t+1, the state update unit 41 predicts that the position of the robot Rbt1 at time t+1 is the candidate point $C1_{t+1}$ or the candidate point $C2_{1+1}$ (prediction 2).

More specifically, the state update unit 41 estimates that the point $C1_{t+1}$, which is a candidate point for the position of the robot Rbt1 at time t+1 predicted through both the prediction 1 and the prediction 2 described above, is the position of the robot Rbt1 at time t+1. The state update unit 41 updates the internal state data, which is the coordinate data $(x0A_{t+1}, y0A_{t+1})$ corresponding to the position of the robot Rbt1 at time t+1, using the coordinate information for the point $C1_{t+1}$.

This internal state data $X_{t+1}$ of the robot Rbt1 at time t+1 obtained by the state update unit 41 is output from the state update unit 41 to the storage unit 5, and is stored into the storage unit 5.

The environmental map update unit 42 obtains information about the detected landmark based on the landmark detection signal $LM_{t+1}$ output from the landmark detection unit 2. The environmental map update unit 42 updates the environmental map data based on the obtained landmark information, the environmental map data $m_t$ at time t, and the internal state data $X_{t+1}$ of the robot Rbt1 at the current time t+1 to obtain the environmental map data $m_{t+1}$ at the current time t+1.

More specifically, when the positional coordinates of the landmark LM1A at time t+1 on the x-y plane are $(x1A_{t+1}, y1A_{t+1})$, and the positional coordinates of the landmark LM1B at time t+1 on the x-y plane are $(x1B_{t+1}, y1B_{t+1})$, the environmental map update unit 42 obtains the positional coordinates (positional information) of the landmarks LM1A and LM1B at time t+1 on the x-y plane using the formulae below:

$$x1A_{t+1} = x0_{t+1} + d1A_{t+1} \times \cos(\theta1A_{t+1}),$$

$$y1A_{t+1} = y0_{t+1} + d1A_{t+1} \times \sin(\theta1A_{t+1}),$$

$$x1B_{t+1} = x0_{t+1} + d1B_{t+1} \times \cos(\theta1B_{t+1}), \text{ and}$$

$$y1B_{t+1} = y0_{t+1} + d1B_{t+1} \times \sin(\theta1B_{t+1})$$

The environmental map update unit 42 updates the environmental map data $m_{t+1}$ using the data obtained as described above.

Processing at Time t+2 and Subsequent Times

The processing described above will be repeated at time t+2 and subsequent times.

The moving object controller 1000 uses a landmark set including two landmarks and measures the distance from the robot Rbt1 to each of the two landmarks, and can thus narrow down the candidates for the position of the robot Rbt1 to fewer points (to two points in the above example), and can estimate the internal state data of the robot Rbt1 including its positional information at high speed and with high accuracy. In the example above, the moving object controller 1000 performs an estimation process twice, or at time t and time t+1, to narrow down the candidates for the position of the robot Rbt1 to one point.

Through the processing described above, the moving object controller 1000 can estimate the position of the moving object (the robot Rbt1) with high accuracy based on landmark information, and can perform a highly accurate estimation process at high speed in an appropriate manner. As a result, the moving object controller 1000 can control the moving object (the robot Rbt1) in an appropriate manner.

As described above, the moving object controller 1000 can also estimate the position of the robot Rbt1 at high speed and with high accuracy simply by obtaining the distance from the robot Rbt1 to each of the two landmarks included in one landmark set. The moving object controller 1000 can thus perform an estimation process involving less calculations without complicated processing using many internal state variables.

Second Embodiment

A second embodiment will now be described.

In the second embodiment, the components that are the same as in the first embodiment are given the same reference numerals as those components, and will not be described in detail.

Figure 4:
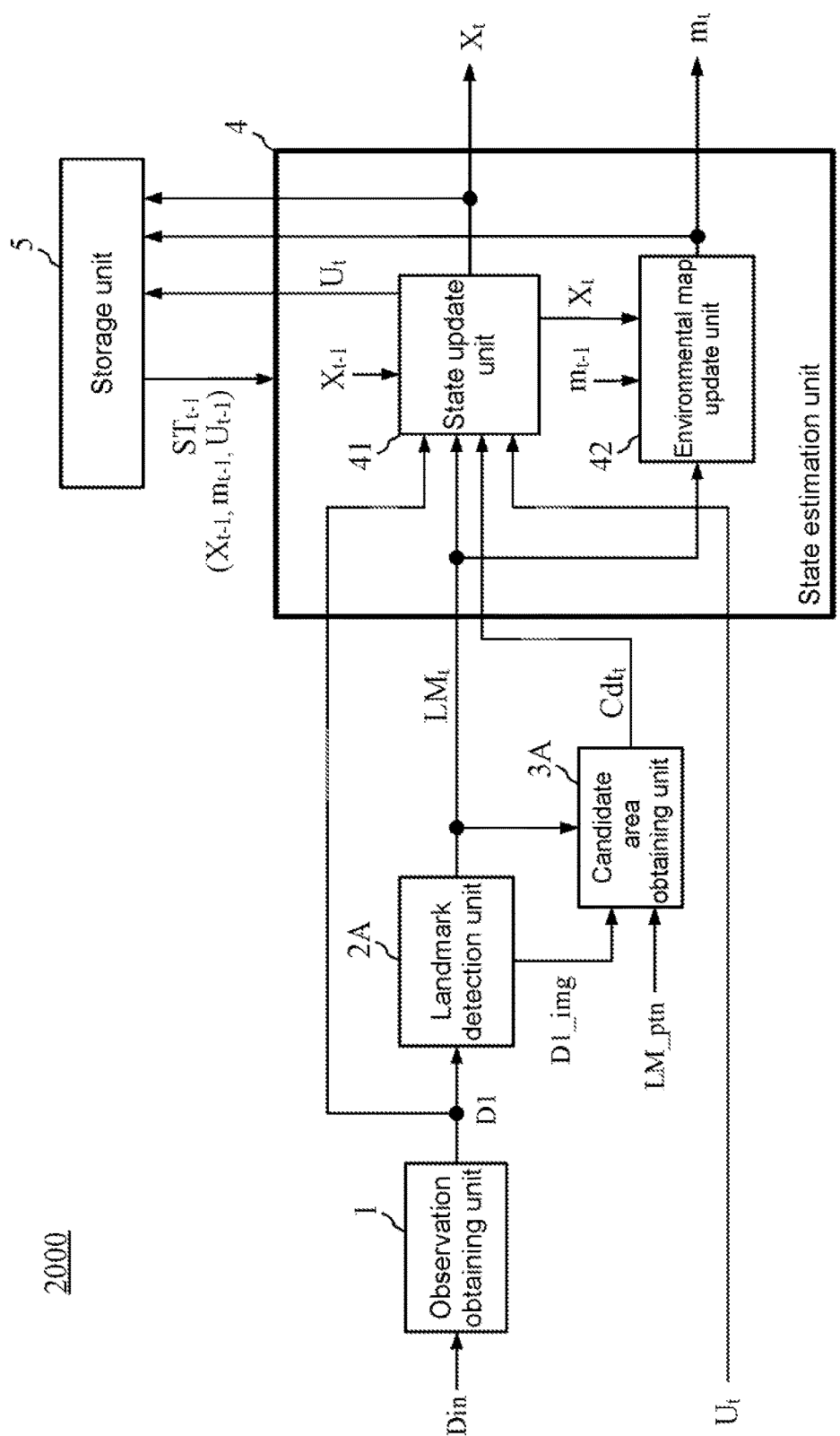
FIG. 4 is a schematic block diagram of a moving object controller 2000 according to a second embodiment.

FIG. 4 is a schematic block diagram of a moving object controller 2000 according to the second embodiment.

As shown in FIG. 4, the moving object controller 2000 of the second embodiment includes a landmark detection unit 2A and a candidate area obtaining unit 3A, which replace the landmark detection unit 2 and the candidate area obtaining unit 3 included in the moving object controller 1000 of the first embodiment, respectively.

In addition to the functions of the landmark detection unit 2, the landmark detection unit 2A extracts an image region including a landmark at time t from an image (image data) captured by the imaging device incorporating the distance sensor (not shown), which is mounted on the robot Rbt1. The landmark detection unit 2A outputs the extracted image to the candidate area obtaining unit 3 as an image D1_img. The landmark detection unit 2A also outputs the landmark detection signal $LM_t$ to the candidate area obtaining unit 3A, the state update unit 41, and the environmental map update unit 42.

As shown in FIG. 4, the candidate area obtaining unit 3A receives the landmark detection signal $LM_t$ and the image D1_img, which are output from the landmark detection unit 2A. The candidate area obtaining unit 3A also receives landmark pattern information LM_ptn. The landmark pattern information LM_ptn is predetermined information indicating a pattern (color or pattern) on the surface of a landmark in an environment in which the robot Rbt1 moves. Based on the landmark pattern information LM_ptn and the image D1_img, the candidate area obtaining unit 3 obtains robot position candidate information $Cdt_t$, which is used to estimate a candidate for the position of the robot Rbt1 at the current time. The candidate area obtaining unit 3A outputs the obtained robot position candidate information $Cdt_t$ to the state update unit 41 included in the state estimation unit 4.

The landmark (one example) used in this embodiment is cylindrical and long. The surface of the landmark includes two areas, (1) a first pattern area having a first pattern, and (2) a second pattern area having a second pattern. As viewed from above the landmark arranged, the first pattern area is one semicircular surface area at the circumference, whereas the second pattern area is the other semicircular surface area at the circumference.

The shape and the surface patterns of the landmark are not limited to the above example. The landmark may have any other shape and/or pattern that allows the moving object controller 2000 detecting the landmark to determine the positional relationship between the moving object (the robot Rbt1) and the landmark (or information that may be used to determine the direction in which the landmark is observed) by recognizing (identifying) the shape and/or pattern of the landmark.

Figure 5:
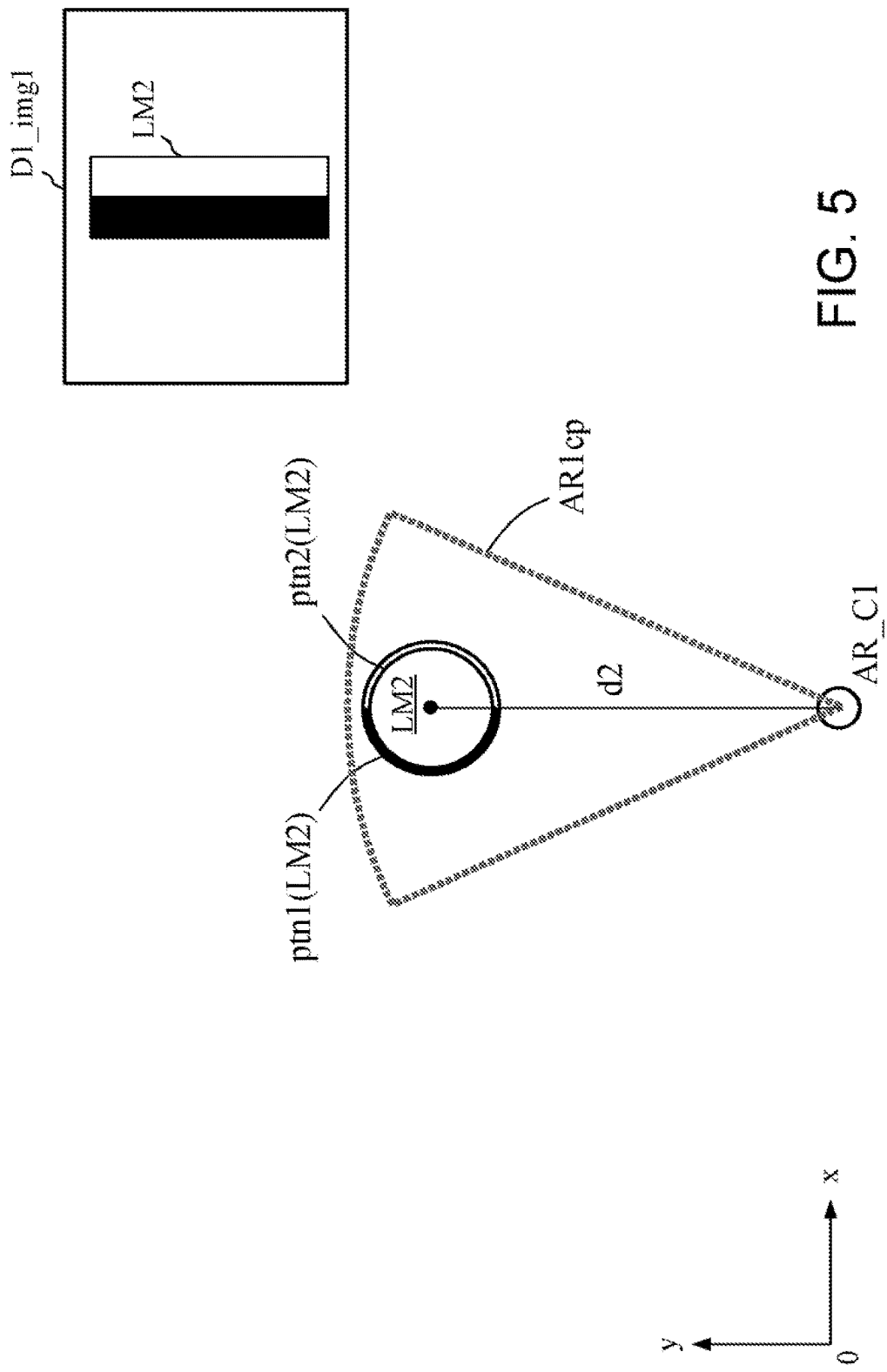
FIG. 5 is a diagram showing the positional relationship between a candidate area AR_C1 for the position of the robot Rbt1 at time t and a landmark LM2 in the second embodiment (viewed from above), and also schematically shows an image (image data) D1_img1 captured at time t by an imaging device incorporating a distance sensor (not shown), which is mounted on the robot Rbt1.

In Example of FIG. 5

FIG. 5 is a diagram showing the positional relationship between a candidate area AR_C1 for the position of the robot Rbt1 at time t and a landmark LM2 used in the present embodiment (viewed from above). FIG. 5 further schematically shows an image (image data) D1_img1 captured at time t by the imaging device incorporating the distance sensor (not shown), which is mounted on the robot Rbt1. The image D1_img1 is an image (image data) output from the landmark detection unit 2A to the candidate area obtaining unit 3A.

The candidate area obtaining unit 3A analyzes the image D1_img1 shown in FIG. 5 based on the landmark pattern information LM_ptn for the landmark LM2. More specifically, the candidate area obtaining unit 3A determines that one semicircular surface area at the circumference of the landmark LM2 viewed from above is the first pattern area (with a solid black pattern) (an area indicated by ptn1 (LM2) in FIG. 5), and the other semicircular surface area at the circumference of the landmark LM2 viewed from above is the second pattern area (with an all-white pattern) (an area indicated by ptn2 (LM2) in FIG. 5) based on the landmark pattern information LM_ptn for the landmark LM2.

The candidate area obtaining unit 3A recognizes the first pattern area (with a solid black pattern) and the second pattern area (with an all-white pattern) around the center of the landmark in the image D1_img1, and determines that the first pattern area (with a solid black pattern) is on the left and the second pattern area (with an all-white pattern) is on the right. Based on these image analysis results, the candidate area obtaining unit 3A determines the candidate area AR_C1 for the position at which the captured image D1_img1 is obtained by the imaging device. More specifically, the candidate area obtaining unit 3A determines the candidate area AR_C1 for the position of the robot Rbt1 at time t as an area that is away from the position of the landmark LM2 (center point) by a distance d2 in the negative direction of y-axis along a line extending from the center point of the landmark LM2 toward the boundary point between the first pattern area ptn1 (LM2) and the second pattern area ptn2 (LM2) of the landmark LM2 viewed from above as shown in FIG. 5. The candidate area obtaining unit 3A obtains the distance d2 between the landmark LM2 and the robot Rbt1 based on the landmark detection signal LM$_r$.

The candidate area obtaining unit 3A generates robot position candidate information Cdt$_t$ including the information about the obtained candidate area AR_C1 for the position of the robot Rbt1 at time t, and outputs the robot position candidate information Cdt$_1$ to the state update unit 41.

Based on the robot position candidate information Cdt$_t$, the state update unit 41 determines that the position of the robot Rbt1 at time t is likely to be the candidate area AR_C1, and updates the internal state data corresponding to the position of the robot Rbt1.

Figure 6:
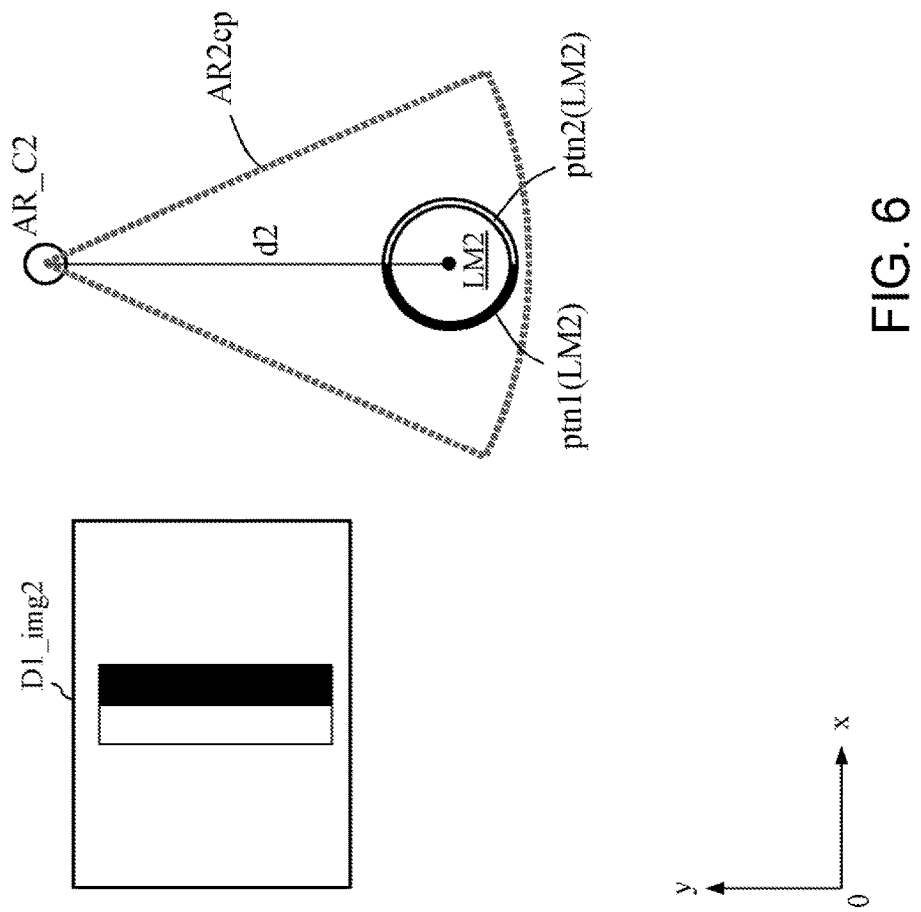
FIG. 6 is a diagram showing the positional relationship between a candidate area AR_C2 for the position of the robot Rbt1 at time t and the landmark LM2 in the second embodiment (viewed from above), and also schematically shows an image (image data) D1_img2 captured at time t by the imaging device incorporating the distance sensor (not shown), which is mounted on the robot Rbt1.

In Example of FIG. 6

FIG. 6 is a diagram showing the positional relationship between a candidate area AR_C2 for the position of the robot Rbt1 at time t and the landmark LM2 used in the present embodiment (viewed from above). FIG. 6 further schematically shows an image (image data) D1_img2 captured at time t by the imaging device incorporating the distance sensor (not shown), which is mounted on the robot Rbt1. The image D1_img2 is an image (image data) output from the landmark detection unit 2A to the candidate area obtaining unit 3A.

The candidate area obtaining unit 3A analyzes the image D1_img2 shown in FIG. 6 based on the landmark pattern information LM_ptn for the landmark LM2. More specifically, the candidate area obtaining unit 3A determines that one semicircular surface area at the circumference of the landmark LM2 viewed from above is the first pattern area (with a solid black pattern) (an area indicated by ptn1 (LM2) in FIG. 6), and the other semicircular surface area at the circumference of the landmark LM2 viewed from above is the second pattern area (with an all-white pattern) (an area indicated by ptn2 (LM2) in FIG. 6) based on the landmark pattern information LM_ptn for the landmark LM2.

The candidate area obtaining unit 3A recognizes the first pattern area (with a solid black pattern) and the second pattern area (with an all-white pattern) around the center of the landmark in the image D1_img2, and determines that the first pattern area (with a solid black pattern) is on the right and the second pattern area (with an all-white pattern) is on the left. Based on these image analysis results, the candidate area obtaining unit 3A determines the candidate area AR_C2 for the position at which the captured image D1_img2 is obtained by the imaging device. More specifically, the candidate area obtaining unit 3A determines the candidate area AR_C2 for the position of the robot Rbt1 at time t as an area that is away from the position of the landmark LM2 (center point) by a distance d2 in the positive direction of y-axis along a line extending from the center point of the landmark LM2 toward the boundary point between the first pattern area ptn1 (LM2) and the second pattern area ptn2 (LM2) of the landmark LM2 viewed from above as shown in FIG. 6. The candidate area obtaining unit 3A obtains the distance d2 between the landmark LM2 and the robot Rbt1 based on the landmark detection signal LM$_r$.

The candidate area obtaining unit 3A generates the robot position candidate information Cdt$_t$ including the information about the obtained candidate area AR_C2 for the position of the robot Rbt1 at time t, and outputs the robot position candidate information Cdt$_t$ to the state update unit 41.

Based on the robot position candidate information Cdt$_t$, the state update unit 41 determines that the position of the robot Rbt1 at time t is likely to be the candidate area AR_C2, and updates the internal state data corresponding to the position of the robot Rbt1.

Figure 7:
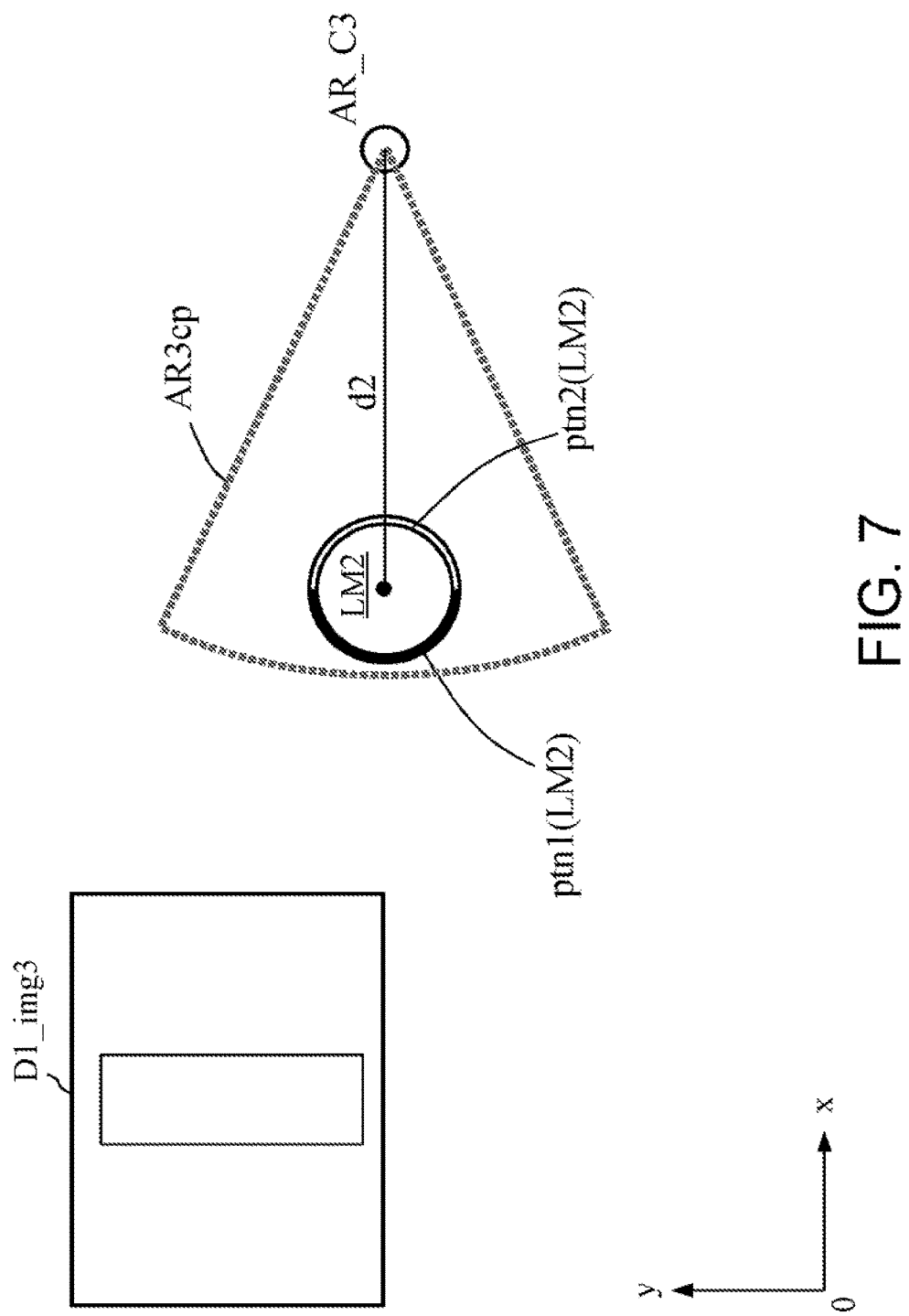
FIG. 7 is a diagram showing the positional relationship between a candidate area AR_C3 for the position of the robot Rbt1 at time t and the landmark LM2 in the second embodiment (viewed from above), and also schematically shows an image (image data) D1_img3 captured at time t by the imaging device incorporating the distance sensor (not shown), which is mounted on the robot Rbt1.

In Example of FIG. 7

FIG. 7 is a diagram showing the positional relationship between a candidate area AR_C3 for the position of the robot Rbt1 at time t and a landmark LM2 used in the present embodiment (viewed from above). FIG. 7 further schematically shows an image (image data) D1_img3 captured at time t by the imaging device incorporating the distance sensor (not shown), which is mounted on the robot Rbt1. The image D1_img3 is an image (image data) output from the landmark detection unit 2A to the candidate area obtaining unit 3A.

The candidate area obtaining unit 3A analyzes the image D1_img3 shown in FIG. 7 based on the landmark pattern information LM_ptn for the landmark LM2. More specifically, the candidate area obtaining unit 3A determines that one semicircular surface area at the circumference of the landmark LM2 viewed from above is the first pattern area (with a solid black pattern) (an area indicated by ptn1 (LM2) in FIG. 7), and the other semicircular surface area at the circumference of the landmark LM2 viewed from above is the second pattern area (with an all-white pattern) (an area indicated by ptn2 (LM2) in FIG. 7) based on the landmark pattern information LM_ptn for the landmark LM2.

The candidate area obtaining unit 3A determines only the second pattern area (with an all-white pattern) of the landmark LM2 in the image D1_img3. Based on these image analysis results, the candidate area obtaining unit 3A determines the candidate area AR_C3 for the position at which the captured image D1_img3 is obtained by the imaging device. More specifically, the candidate area obtaining unit 3A determines the candidate area AR_C3 for the position of the robot Rbt1 at time t as an area that is away from the position of the landmark LM2 (center point) by a distance d2 in the positive direction of x-axis along a line extending from the center point of the landmark LM2 toward substantially the middle point, along the circumference, of the second pattern area ptn2 (LM2) of the landmark LM2 viewed from above as shown in FIG. 7. The candidate area obtaining unit 3A obtains the distance d2 between the landmark LM2 and the robot Rbt1 based on the landmark detection signal $LM_1$.

The candidate area obtaining unit 3A generates the robot position candidate information Cdtt including the information about the obtained candidate area AR_C3 for the position of the robot Rbt1 at time t, and outputs the robot position candidate information $Cdt_t$ to the state update unit 41.

Based on the robot position candidate information $Cdt_t$, the state update unit 41 determines that the position of the robot Rbt1 at time t is likely to be the candidate area AR_C3, and updates the internal state data corresponding to the position of the robot Rbt1.

Figure 8:
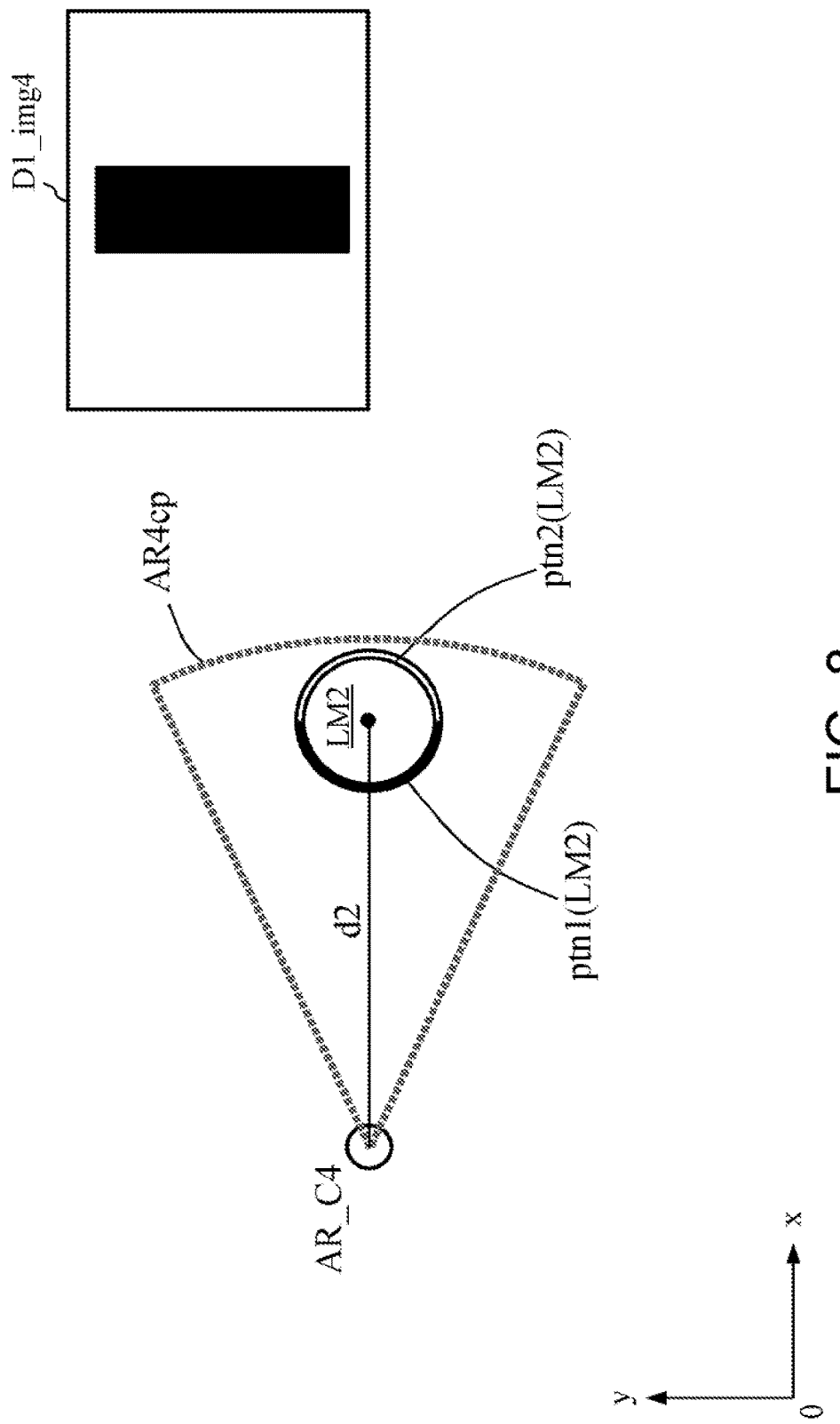
FIG. 8 is a diagram showing the positional relationship between a candidate area AR_C4 for the position of the robot Rbt1 at time t and the landmark LM2 in the second embodiment (viewed from above), and also schematically shows an image (image data) D1_img4 captured at time t by the imaging device incorporating the distance sensor (not shown), which is mounted on the robot Rbt1.

In Example of FIG. 8

FIG. 8 is a diagram showing the positional relationship between a candidate area AR_C4 for the position of the robot Rbt1 at time t and a landmark LM2 used in the present embodiment (viewed from above). FIG. 8 further schematically shows an image (image data) D1_img4 captured at time t by the imaging device incorporating the distance sensor (not shown), which is mounted on the robot Rbt1. The image D1_img4 is an image (image data) output from the landmark detection unit 2A to the candidate area obtaining unit 3A.

The candidate area obtaining unit 3A analyzes the image D1_img4 shown in FIG. 8 based on the landmark pattern information LM_ptn for the landmark LM2. More specifically, the candidate area obtaining unit 3A determines that one semicircular surface area at the circumference of the landmark LM2 viewed from above is the first pattern area (with a solid black pattern) (an area indicated by ptn1 (LM2) in FIG. 8), and the other semicircular surface area at the circumference of the landmark LM2 viewed from above is the second pattern area (with an all-white pattern) (an area indicated by ptn2 (LM2) in FIG. 8) based on the landmark pattern information LM_ptn for the landmark LM2.

The candidate area obtaining unit 3A recognizes only the first pattern area (with a solid black pattern) around the center of the landmark in the image D1_img4. Based on these image analysis results, the candidate area obtaining unit 3A determines the candidate area AR_C4 for the position at which the captured image D1_img4 is obtained by the imaging device. More specifically, the candidate area obtaining unit 3A determines the candidate area AR_C4 for the position of the robot Rbt1 at time t as an area that is away from the position of the landmark LM2 (center point) by a distance d2 in the negative direction of x-axis along a line extending from the center point of the landmark LM2 toward substantially the middle point, along the circumference, of the second pattern area ptn2 (LM2) of the landmark LM2 viewed from above as shown in FIG. 8. The candidate area obtaining unit 3A obtains the distance d2 between the landmark LM2 and the robot Rbt1 based on the landmark detection signal $LM_t$.

The candidate area obtaining unit 3A generates robot position candidate information $Cdt_t$ including the information about the obtained candidate area AR_C4 for the position of the robot Rbt1 at time t, and outputs the robot position candidate information $Cdt_t$ to the state update unit 41.

Based on the robot position candidate information $Cdt_t$, the state update unit 41 determines that the position of the robot Rbt1 at time t is likely to be the candidate area AR_C4, and updates the internal state data corresponding to the position of the robot Rbt1.

Figure 9:
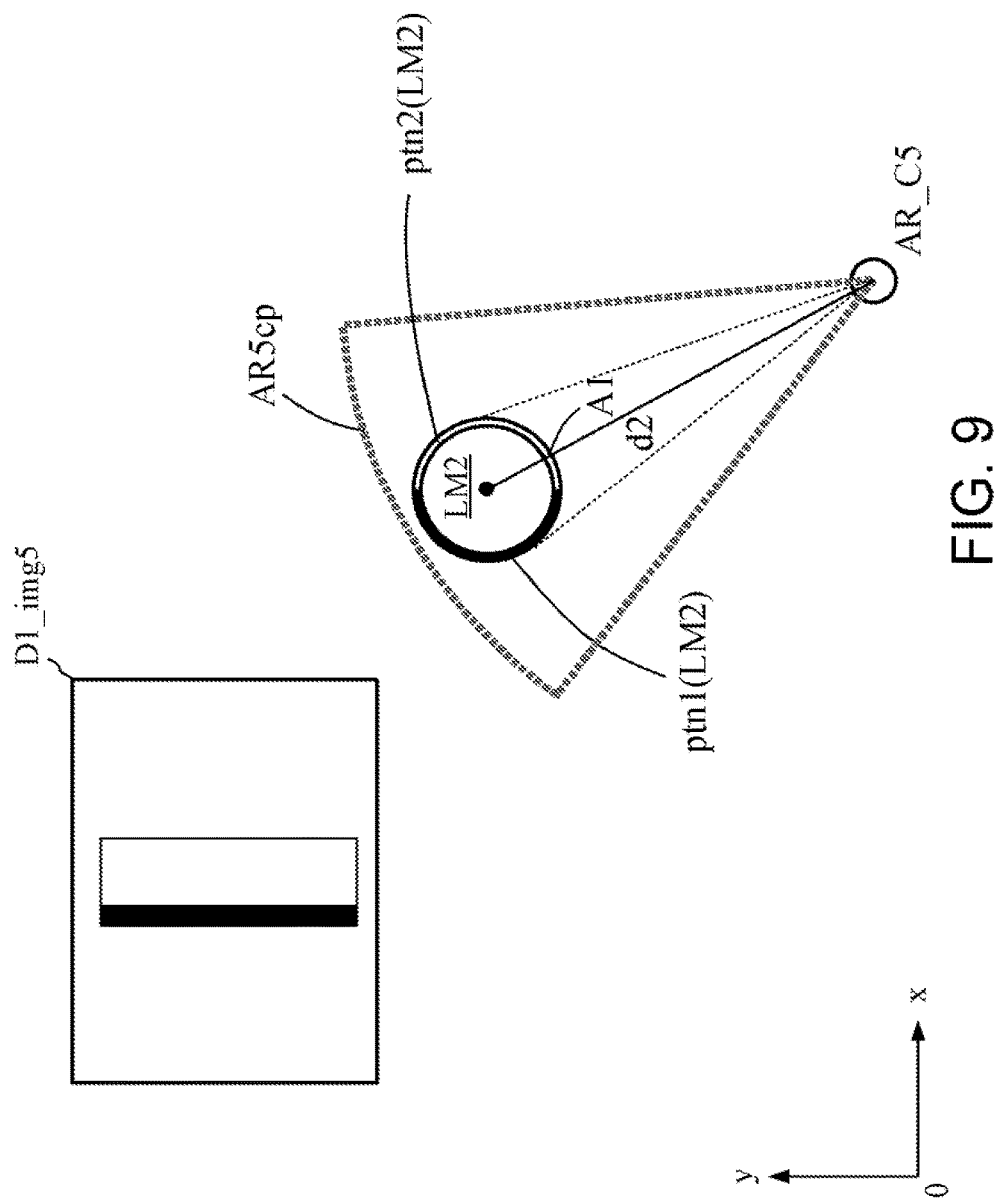
FIG. 9 is a diagram showing the positional relationship between a candidate area AR_C5 for the position of the robot Rbt1 at time t and the landmark LM2 in the second embodiment (viewed from above), and also schematically shows an image (image data) D1_img5 captured at time t by the imaging device incorporating the distance sensor (not shown), which is mounted on the robot Rbt1.

In Example of FIG. 9

FIG. 9 is a diagram showing the positional relationship between a candidate area AR_C5 for the position of the robot Rbt1 at time t and a landmark LM2 used in the present embodiment (viewed from above). FIG. 9 further schematically shows an image (image data) D1_img5 captured at time t by the imaging device incorporating the distance sensor (not shown), which is mounted on the robot Rbt1. The image D1_img5 is an image (image data) output from the landmark detection unit 2A to the candidate area obtaining unit 3A.

The candidate area obtaining unit 3A analyzes the image D1_img5 shown in FIG. 9 based on the landmark pattern information LM_ptn for the landmark LM2. More specifically, the candidate area obtaining unit 3A determines that one semicircular surface area at the circumference of the landmark LM2 viewed from above is the first pattern area (with a solid black pattern) (an area indicated by ptn1 (LM2) in FIG. 9), and the other semicircular surface area at the circumference of the landmark LM2 viewed from above is the second pattern area (with an all-white pattern) (an area indicated by ptn2 (LM2) in FIG. 9) based on the landmark pattern information LM_ptn for the landmark LM2.

The candidate area obtaining unit 3A recognizes the first pattern area (with a solid black pattern) and the second pattern area (with an all-white pattern) in a left area of the landmark in the image D1_img5, and determines that the first pattern area (with a solid black pattern) is on the left and the second pattern area (with an all-white pattern) is on the right. The candidate area obtaining unit 3A also determines the proportion of the first pattern area and the proportion of the second pattern area in the horizontal direction of the image. Based on these image analysis results, the candidate area obtaining unit 3A determines the candidate area AR_C5 for the position at which the captured image D1_img5 is obtained by the imaging device. More specifically, the candidate area obtaining unit 3A determines a point that is away from the position of the landmark LM2 (center point) by the distance d2 and from which the landmark appears in the same manner as in the image D1_img5 as viewed from above in FIG. 9. In FIG. 9, an area that is away from the center point of the landmark LM2 by the distance d2 in an obliquely downward direction of a line extending from the center point of the landmark LM2 toward a point A1 in FIG. 9 is determined as the candidate area AR_C5 for the position of the robot Rbt1 at time t as viewed from above. The candidate area obtaining unit 3A obtains the distance d2 between the landmark LM2 and the robot Rbt1 based on the landmark detection signal $LM_t$.

The candidate area obtaining unit 3A generates robot position candidate information $Cdt_t$ including the information about the obtained candidate area AR_C5 for the position of the robot Rbt1 at time t, and outputs the robot position candidate information $Cdt_t$ to the state update unit 41.

Based on the robot position candidate information $Cdt_t$, the state update unit 41 determines that the position of the robot Rbt1 at time t is likely to be the candidate area AR_C5, and updates the internal state data corresponding to the position of the robot Rbt1.

As described above, the moving object controller 2000 obtains a captured image of a landmark having a predetermined pattern as actual observation data, and analyzes the appearance of the landmark in the captured image. The moving object controller 2000 can thus estimate the position of the moving object (robot Rbt1) with high accuracy, and can perform a highly accurate state estimation process at high speed in an appropriate manner. As a result, the moving object controller 2000 can control the moving object (the robot Rbt1) in an appropriate manner.

Further, the moving object controller 2000 can also estimate the position of the robot Rbt1 with high accuracy at high speed simply by obtaining the distance between a landmark and the robot Rbt1. The moving object controller 2000 can thus perform an estimation process involving less calculations without complicated processing using many internal state variables.

Figure 10:
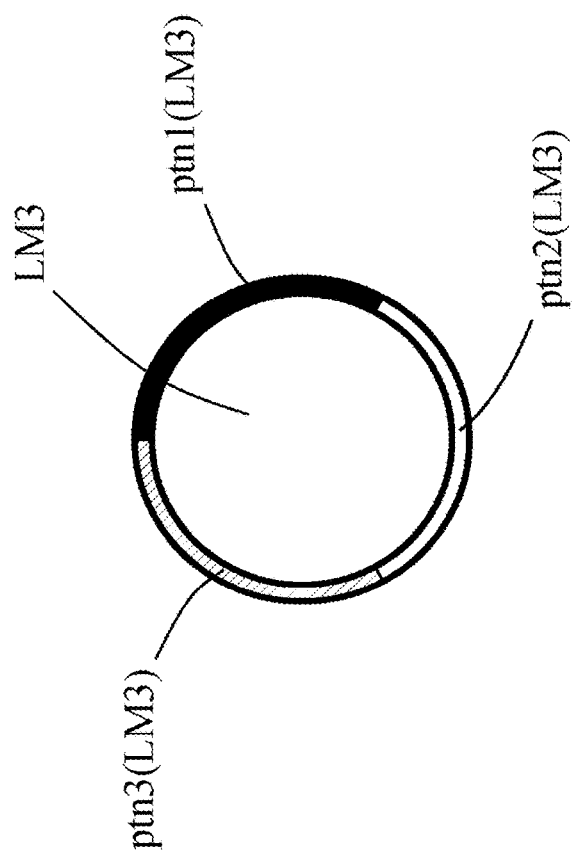
FIG. 10 schematically shows a landmark LM3 (viewed from above).

Although the landmark in the present embodiment has the first pattern area (with a solid black pattern) and the second pattern area (with an all-white pattern), the landmark may have another number of patterns in some embodiments. For example, a landmark LM3 shown in FIG. 10 has three patterns, namely, a first pattern area (pattern ptn1 (LM3) in FIG. 10), a second pattern area (pattern ptn2 (LM3) in FIG. 10), and a pattern ptn3 (LM3) in FIG. 10 as viewed from above. In other embodiments, the landmark may have four or more patterns.

Other Embodiments

Although the imaging device incorporating the distance sensor mounted on the robot Rbt1 obtains a colored captured image and a distance image in the above embodiments, the embodiments may not be limited to this structure. For example, a stereoscopic camera mounted on the robot Rbt1 may capture two images that are used to obtain a distance image. In some embodiments, a distance sensor, such as a range finder, may be mounted on the robot Rbt1 to measure the distance to a landmark.

In some embodiments, a plurality of sensors may be mounted on the robot Rbt1 to obtain signals that are used to obtain actual observation data.

Although x-y coordinates are set for generating environmental map data as shown in FIGS. 2 and 3 and FIGS. 5 to 9 in the above embodiments, the embodiments may not be limited to this example. For example, polar coordinates may be used. Although absolute coordinates are used in the above embodiments, the embodiments should not be limited to this example. For example, the processing in the above embodiments may be performed using relative coordinates with the position of the robot Rbt1 as the origin.

Although the position of the moving object (the robot Rbt1) and the positions of the landmarks are defined using two-dimensional data (x-coordinate and y-coordinate values) in the above embodiments, the embodiments should not be limited to this example. The position of the moving object (the robot Rbt1) and the positions of the landmarks may also be determined using three-dimensional data (e.g., x-coordinate, y-coordinate, and z-coordinate values). When, for example, the positions of the moving object (the robot Rbt1) and landmarks are defined using three-dimensional data, or specifically when the landmark LM1A is at one point in a three-dimensional space and the landmark LM1B is at another point in the three-dimensional space, a candidate position for the robot Rbt1 at time t is on a circle formed by the intersection of a sphere with a radius $d1A_t$ centered on the landmark LM1A and a sphere with a radius $d1B_1$ centered on the landmark LM1B.

The above embodiments and modifications may be combined to form the moving object controller.

Each block of the moving object controller described in the above embodiments may be formed using a single chip with a semiconductor device, such as an LSI (large-scale integration) device, or some or all of the blocks of the moving object controller may be formed using a single chip.

Although LSI is used as the semiconductor device technology, the technology may be an integrated circuit (IC), a system LSI, a super LSI, or an ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

All or part of the processes performed by the functional blocks described in the above embodiments may be implemented using programs. All or part of the processes performed by the functional blocks described in the above embodiments may be implemented by a central processing unit (CPU), a microprocessor, and a processor in a computer. The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a predetermined library), or may be implemented using both software and hardware.

The processes described in the above embodiments may not be performed in the order specified in the above embodiments. The order in which the processes are performed may be changed without departing from the scope and the spirit of the invention.

The present invention may also include a computer program enabling a computer to implement the method described in the above embodiments and a computer readable recording medium on which such a program is recorded. The computer readable recording medium may be, for example, a flexible disk, a hard disk, a CD-ROM, an MO, a DVD, a DVD-ROM, a DVD-RAM, a large-capacity DVD, a next-generation DVD, or a semi conductor memory.

The computer program may not be recorded on the recording medium but may be transmitted with an electric communication line, a radio or cable communication line, or a network such as the Internet.

The term "unit" herein may include "circuitry," which may be partly or entirely implemented by using either hardware or software, or both hardware and software.

The specific structures described in the above embodiments of the present invention are mere examples, and may be changed and modified variously without departing from the scope and the spirit of the invention.

APPENDIXES

The present invention may also be expressed in the following forms.

A first aspect of the invention provides a moving object controller for controlling a moving object that moves in an environment in which at least one landmark set including two or more landmarks is arranged. The moving object controller performs processing for generating an environmental map expressed using information about the landmarks and performs processing for estimating an internal state of the moving object. The controller includes an observation obtaining unit, a landmark detection unit, a candidate area obtaining unit, and a state estimation unit.

The observation obtaining unit obtains observation data from an observable event.

The landmark detection unit obtains, based on the observation data obtained by the observation obtaining unit, (1) a distance between the moving object and each of the two or more landmarks included in the landmark set as landmark distance information, and (2) an angle formed by a predetermined axis and a line connecting the moving object and each of the two or more landmarks included in the landmark set as landmark angle information.

The candidate area obtaining unit determines a candidate area for a position of the moving object based on the landmark distance information obtained by the landmark detection unit, and obtains information indicating the determined candidate area as candidate area information.

The state estimation unit estimates the internal state of the moving object based on the observation data obtained by the observation obtaining unit, the landmark distance information and the landmark angle information generated by the landmark detection unit, and the candidate area information obtained by the candidate area obtaining unit to obtain moving object internal state estimation data, and estimates the environmental map based on the candidate area information, the landmark distance information, and the landmark angle information to obtain environmental map data.

This moving object controller uses at least one landmark set including two or more landmarks and measures the distance from the moving object to each of the two or more landmarks. The moving object controller can thus narrow down the candidates for the position of the moving object to fewer points, and can estimate the internal state data of the moving object including its positional information at high speed and with high accuracy. More specifically, the moving object controller can estimate the position of the moving object with high accuracy based on landmark information, and can perform a highly accurate estimation process at high speed in an appropriate manner. As a result, the moving object controller can control the moving object in an appropriate manner.

As described above, the moving object controller can also estimate the position of the moving object at high speed and with high accuracy simply by obtaining the distance from the moving object to each of the two or more landmarks included in one landmark set. The moving object controller can thus perform an estimation process involving less calculations without complicated processing using many internal state variables.

A second aspect of the invention provides a moving object controller for controlling a moving object that moves in an environment in which a landmark with a three-dimensional shape is arranged. The landmark includes a first surface area and a second surface area. The first surface area is a part of a surface of the landmark and has a first pattern. The second surface area is another part of the surface of the landmark and has a second pattern different from the first pattern. The moving object controller performs processing for generating an environmental map expressed using information about the landmark and performs processing for estimating an internal state of the moving object. The controller includes an observation obtaining unit, a landmark detection unit, a candidate area obtaining unit, and a state estimation unit.

The observation obtaining unit obtains observation data from an observable event. The observation data includes a captured landmark image obtained by capturing an image of the landmark.

The landmark detection unit obtains, based on the observation data obtained by the observation obtaining unit, (1) a distance between the moving object and the landmark as landmark distance information, and (2) an angle formed by a predetermined axis and a line connecting the moving object and the landmark as landmark angle information The candidate area obtaining unit determines a candidate area for a position of the moving object based on the landmark distance information obtained by the landmark detection unit and an appearance state of the first pattern and the second pattern of the landmark in the captured landmark image, and obtains information about the determined candidate area as candidate area information.

The state estimation unit estimates the internal state of the moving object based on the observation data obtained by the observation obtaining unit, the landmark distance information and the landmark angle information generated by the landmark detection unit, and the candidate area information obtained by the candidate area obtaining unit to obtain moving object internal state estimation data, and estimates the environmental map based on the candidate area information, the landmark distance information, and the landmark angle information to obtain environmental map data.

As described above, the moving object controller obtains an image by capturing an image of a landmark having a predetermined pattern as actual observation data, and analyzes the appearance of the landmark in the captured image. The moving object controller can thus estimate the position of the moving object with high accuracy, and can perform a highly accurate state estimation process at high speed in an appropriate manner. As a result, the moving object controller can control the moving object in an appropriate manner.

The moving object controller can also estimate the position of the moving object at high speed and with high accuracy simply by obtaining the distance from the moving object to the landmark. The moving object controller can thus perform an estimation process involving less calculations without complicated processing using many internal state variables.

The appearance state of the first pattern and the second pattern of the landmark is, for example, a state specified by (1) the position, (2) the shape, (3) the area, or other attributes of an image region corresponding to the first pattern of the landmark in the captured image and an image region corresponding to the second pattern of the landmark in the captured image.

A third aspect of the invention provides the moving object controller of the second aspect of the invention in which the candidate area obtaining unit determines a candidate area for the position of the moving object based on the landmark distance information and a proportion of the first pattern of the landmark and a proportion of the second pattern of the landmark in the captured landmark image, and obtains information about the determined candidate area as candidate area information.

This moving object controller can determine a candidate area for the position of the moving object based on the proportion of the first pattern and the proportion of the second pattern of the landmark in the captured landmark image.

A fourth aspect of the invention provides a landmark having a three-dimensional shape to be used with the moving object controller according to the second or third aspect of the invention, in which the landmark includes a first surface area that is a part of a surface of the landmark and has a first pattern, and a second surface area that is another part of the surface of the landmark and has a second pattern different from the first pattern.

The landmark can be used by the moving object controller according to the second or third aspect of the invention to efficiently perform processing for estimating the internal state data of the moving object and perform processing for obtaining the environmental map.

A fifth aspect of the invention provides a moving object control method for controlling a moving object that moves in an environment in which at least one landmark set including two or more landmarks is arranged by performing processing for generating an environmental map expressed using information about the landmarks and performing processing for estimating an internal state of the moving object. The method includes an observation obtaining step, a landmark detection step, a candidate area obtaining step, and a state estimation step.

The observation obtaining step obtains observation data from an observable event.

The landmark detection step obtains, based on the observation data obtained by the observation obtaining step, (1) a distance between the moving object and each of the two or more landmarks included in the landmark set as landmark distance information, and (2) an angle formed by a predetermined axis and a line connecting the moving object and each of the two or more landmarks included in the landmark set as landmark angle information.

The candidate area obtaining step determines a candidate area for a position of the moving object based on the landmark distance information obtained by the landmark detection step, and obtains information indicating the determined candidate area as candidate area information.

The state estimation step estimates the internal state of the moving object based on the observation data obtained by the observation obtaining step, the landmark distance information and the landmark angle information generated by the landmark detection step, and the candidate area information obtained by the candidate area obtaining step to obtain moving object internal state estimation data, and estimates the environmental map based on the candidate area information, the landmark distance information, and the landmark angle information to obtain environmental map data.

The moving object control method has the same advantageous effects as the moving object controller of the first aspect of the present invention.

A sixth aspect of the invention provides a moving object control method for controlling a moving object that moves in an environment in which a landmark with a three-dimensional shape is arranged by performing processing for generating an environmental map expressed using information about the landmark and performing processing for estimating an internal state of the moving object. The landmark includes a first surface area and a second surface area. The first surface area is a part of a surface of the landmark and has a first pattern. The second surface area is another part of the surface of the landmark and has a second pattern different from the first pattern.

The method includes an observation obtaining step, a landmark detection step, a candidate area obtaining step, and a state estimation step.

The observation obtaining step obtains observation data from an observable event. The observation data includes a captured landmark image obtained by capturing an image of the landmark.

The landmark detection step obtains, based on the observation data obtained by the observation obtaining step, (1) a distance between the moving object and the landmark as landmark distance information, and (2) an angle formed by a predetermined axis and a line connecting the moving object and the landmark as landmark angle information.

The candidate area obtaining step determines a candidate area for a position of the moving object based on the landmark distance information obtained by the landmark detection step, and an appearance state of the first pattern and the second pattern of the landmark in the captured landmark image, and obtains information about the determined candidate area as candidate area information.

The state estimation step estimates the internal state of the moving object based on the observation data obtained by the observation obtaining step, the landmark distance information and the landmark angle information generated by the landmark detection step, and the candidate area information obtained by the candidate area obtaining step to obtain moving object internal state estimation data, and estimates the environmental map based on the candidate area information, the landmark distance information, and the landmark angle information to obtain environmental map data.

The moving object control method has the same advantageous effects as the moving object controller of the second aspect of the present invention.

What is claimed is:

1. A moving object controller for controlling a mobile machine that moves in an environment in which at least one landmark set including two or more landmarks is arranged, the moving object controller being configured to perform processing for generating an environmental map expressed using information about the landmarks and perform processing for estimating an internal state of the mobile machine, the controller comprising:
observation obtaining circuitry configured to obtain observation data collected from a sensor;
landmark detection circuitry configured to obtain, based on the observation data obtained by the observation obtaining circuitry, (1) a distance between the mobile machine and each of the two or more landmarks included in the landmark set as landmark distance information, and (2) an angle formed by a predetermined axis and a line connecting the mobile machine and each of the two or more landmarks included in the landmark set as landmark angle information;

candidate area obtaining circuitry configured to obtain candidate area information indicating candidate areas for a position of the mobile machine based on the landmark distance information obtained by the landmark detection circuitry, the candidate area information including information for a plurality of intersection points between circles centered on each of the two or more landmarks, each circle having a radius corresponding to the distance between the mobile machine and the corresponding landmark;

state estimation circuitry configured to estimate the internal state of the mobile machine based on the observation data obtained by the observation obtaining circuitry, the landmark distance information and the landmark angle information generated by the landmark detection circuitry, and the candidate area information obtained by the candidate area obtaining circuitry, and estimate the environmental map based on the candidate area information, the landmark distance information, and the landmark angle information; and control circuitry configured to control the mobile machine for moving autonomously based on outputs of the state estimation circuitry.

2. A moving object control method for controlling a mobile machine that moves in an environment in which at least one landmark set including two or more landmarks is arranged by performing processing for generating an environmental map expressed using information about the landmarks and performing processing for estimating an internal state of the mobile machine, the method comprising:

(a) obtaining observation data collected from a sensor;
(b) obtaining, based on the observation data obtained by the step of obtaining the observation data, (1) a distance between the mobile machine and each of the two or more landmarks included in the landmark set as landmark distance information, and (2) an angle formed by a predetermined axis and a line connecting the mobile machine and each of the two or more landmarks included in the landmark set as landmark angle information;
(c) obtaining candidate area information indicating candidate areas for a position of the mobile machine based on the landmark distance information obtained by the step of obtaining the landmark distance information and the landmark angle information, the candidate area information including information for a plurality of intersection points between circles centered on each of the two or more landmarks, each circle having a radius corresponding to the distance between the mobile machine and the corresponding landmark;
(d) estimating the internal state of the mobile machine based on the observation data obtained by the step of obtaining the observation data, the landmark distance information and the landmark angle information generated by the step of obtaining the landmark distance information and the landmark angle information;
estimating the environmental map based on the candidate area information, the landmark distance information, and the landmark angle information; and
(e) controlling the mobile machine for moving autonomously based on outputs of steps (d).

* * * * *